(12) United States Patent
Zhu et al.

(10) Patent No.: US 10,349,460 B2
(45) Date of Patent: Jul. 9, 2019

(54) DUAL ACTIVE CONNECTIONS OVER SINGLE RADIO USER EQUIPMENT

(71) Applicants: QUALCOMM Incorporated, San Diego, CA (US); Xipeng Zhu, Beijing (CN); Gavin Bernard Horn, La Jolla, CA (US)

(72) Inventors: Xipeng Zhu, Beijing (CN); Gavin Bernard Horn, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/523,641

(22) PCT Filed: Sep. 28, 2015

(86) PCT No.: PCT/CN2015/090900
§ 371 (c)(1),
(2) Date: May 1, 2017

(87) PCT Pub. No.: WO2016/095582
PCT Pub. Date: Jun. 23, 2016

(65) Prior Publication Data
US 2018/0110088 A1 Apr. 19, 2018

Related U.S. Application Data

(63) Continuation of application No. PCT/CN2014/093807, filed on Dec. 15, 2014.

(51) Int. Cl.
*H04W 4/00* (2018.01)
*H04W 76/16* (2018.01)
(Continued)

(52) U.S. Cl.
CPC .......... *H04W 76/16* (2018.02); *H04W 76/15* (2018.02); *H04W 76/28* (2018.02); *H04W 36/24* (2013.01)

(58) Field of Classification Search
None
See application file for complete search history.

(56) References Cited

U.S. PATENT DOCUMENTS

| 8,842,602 B2 * | 9/2014 | Koo | .................. H04W 72/1215 370/252 |
| 9,313,799 B2 * | 4/2016 | Tzoreff | .................. H04W 88/06 370/328 |

(Continued)

FOREIGN PATENT DOCUMENTS

| CN | 1714587 A | 12/2005 |
| CN | 102231877 A | 11/2011 |

(Continued)

OTHER PUBLICATIONS

International Search Report and Written Opinion—PCT/CN2014/093807—ISA/EPO—dated Sep. 21, 2015.
(Continued)

*Primary Examiner* — Anh Vu H Ly
(74) *Attorney, Agent, or Firm* — Linda G. Gunderson; Loza & Loza LLP

(57) ABSTRACT

A technique is disclosed to facilitate dual active connections by a UE device using a transmitter. A first connection is established with a first access node for wireless communication services. A first coexistence indicator provided/sent by the UE device to the first access node indicating that the UE device supports multiple concurrent connections. In response to providing the first coexistence indicator, the UE device receives a first transmit pattern and a first receive pattern. The transmitter may be configure to transmit according to the first transmit pattern for the first connection while sharing transmission resources with at least one other connection. Other aspects, embodiments, and features are also described and claimed herein.

27 Claims, 9 Drawing Sheets

(51) Int. Cl.
*H04W 76/28* (2018.01)
*H04W 76/15* (2018.01)
*H04W 36/24* (2009.01)

(56) References Cited

U.S. PATENT DOCUMENTS

| | | | |
|---|---|---|---|
| 9,554,309 B2* | 1/2017 | Park | H04W 36/0055 370/328 |
| 2009/0316575 A1 | 12/2009 | Gholmieh et al. | |
| 2011/0170420 A1 | 7/2011 | Xi et al. | |
| 2012/0258707 A1* | 10/2012 | Mathias | H04W 36/30 455/426.1 |
| 2013/0201890 A1* | 8/2013 | Swaminathan | H04W 88/06 370/311 |
| 2014/0031036 A1* | 1/2014 | Koo | H04W 36/14 455/434 |
| 2014/0086209 A1* | 3/2014 | Su | H04W 76/026 370/331 |
| 2014/0194157 A1* | 7/2014 | Ezekiel | H04W 76/15 455/552.1 |
| 2014/0341108 A1* | 11/2014 | Desai | H04L 5/0032 370/328 |
| 2015/0215965 A1* | 7/2015 | Yamada | H04W 76/27 370/329 |
| 2015/0237505 A1* | 8/2015 | Su | H04W 16/14 370/330 |
| 2015/0282237 A1* | 10/2015 | Su | H04W 76/16 455/552.1 |
| 2015/0327243 A1* | 11/2015 | Yin | H04W 52/281 370/329 |
| 2017/0026985 A1* | 1/2017 | Lindoff | H04L 1/0006 370/329 |
| 2017/0127217 A1* | 5/2017 | Miao | H04W 76/10 370/329 |

FOREIGN PATENT DOCUMENTS

| | | | | |
|---|---|---|---|---|
| EP | 2595449 A1 | 5/2013 | | |
| WO | 2009132290 A2 | 10/2009 | | |
| WO | WO-2012019564 A1 * | 2/2012 | ........... | H04B 1/1027 |
| WO | WO-2012103034 A1 | 8/2012 | | |
| WO | WO-2013019182 A1 | 2/2013 | | |
| WO | WO-2013116392 A1 | 8/2013 | | |
| WO | WO-2013133911 A1 | 9/2013 | | |
| WO | WO-2013153513 A2 | 10/2013 | | |
| WO | 2014049498 A1 | 4/2014 | | |
| WO | 2014094885 A1 | 6/2014 | | |
| WO | WO-2014114273 A1 | 7/2014 | | |

OTHER PUBLICATIONS

International Search Report and Written Opinion—PCT/CN2015/090900—ISA/EPO—dated Jan. 4, 2016.
Supplementary European Search Report—EP15869093—Search Authority—Berlin—dated Jun. 14, 2018.

* cited by examiner

DUAL ACTIVE CONNECTIONS OVER SINGLE RADIO USER EQUIPMENT

CROSS-REFERENCE TO RELATED APPLICATION(S)

This application is the U.S. national stage of PCT patent application number PCT/CN2015/090900 filed on Sep. 28, 2015 which is a continuation, and claims the priority and benefit, of PCT patent application number PCT/CN2014/093807 filed on Dec. 15, 2014. The disclosures of the foregoing applications are incorporated herein by reference in their entirety.

FIELD

Various features disclosed herein relate generally to cellular/wireless communication systems, and at least some features pertain more particularly to methods and devices for facilitating dual active connections from devices having a single radio.

INTRODUCTION

Mobile devices, such as mobile phones, wireless modems, tablets, or any other device with a processor that communicates with other devices through wireless signals are becoming increasingly popular and are used more frequently. Subscribers using such mobile devices in a cellular/wireless communication network are typically authenticated by the wireless communication network before being granted access to initiate and/or receive calls and transmit and/or receive data.

During use it is sometimes desirable to have two active connections (e.g., different frequencies/channels on the same radio access technology RAT, or on different RATs) from a mobile device. However, mobile devices usually include just a single radio communication device as multiple radio devices increase the cost and/or complexity of the mobile device.

SUMMARY

Various features facilitate maintaining concurrent wireless connections by a user equipment device using a single radio. This may be accomplished, for example, by obtaining transmit patterns and receive patterns for each connection, where the transmit patterns indicate an allocation (e.g., of time slots or radio resources). A transmitter may then switch between two or more connections according to the transmit pattern for each connection. In one example, the transmit patterns may be distinct for each connection sharing the transmitter. Similarly, a receiver may switch between two or more connections according to a receive pattern for each connection.

A first aspect provides a method operational on a user equipment (UE) device is provided for facilitating a dual active connections. A first transmit pattern and a separate first receive pattern are received. A transmitter is then configured to transmit, over a first connection with a first access node, according to the first transmit pattern for the first connection and a receiver to receive according to the receive pattern for the first connection. The first connection with the first access node is established for wireless communication services due to a handover from a different access node or a re-establishment of an idle connection.

A first coexistence indicator is provided to the first access node, wherein the first transmit pattern and/or the first receive pattern are received in response to the first coexistence indicator. The first coexistence indicator may indicate at least one of: (a) that the UE device supports multiple concurrent connections; or (b) a proposed first transmit pattern and/or a proposed first receive pattern. The first coexistence indicator may indicate a radio access technology used by one or more other concurrent connections for the UE device.

At least one of the first transmit pattern and the first receive pattern may be based, at least partially, on the radio access technology used by the one or more other concurrent connections.

In one example, the first coexistence indicator may indicate one or more services used over one or more other concurrent connections for the UE device.

The transmitter may be configured to facilitate dual active connections including the first connection and one or more other distinct connections. The first connection and the one or more distinct connections may be with distinct access nodes or use distinct radio access technologies.

An indicator may be provided to the first access node indicating that only the transmitter is available at the UE device for connections.

Alternatively, a second coexistence indicator may be provided, via a second connection, to the first access node or a second access node. In response to the second coexistence indicator, a second transmit pattern and a second receive pattern may be received. The transmitter may be configured to transmit according to the second transmit pattern for the second connection while concurrently supporting the first connection.

In one implementation, the transmitter may use time division multiplexing (TDM) to allocate time slots according to the first transmit pattern and a second transmit pattern associated with a distinct second connection.

Packets may be consolidated for transmission over the first connection while the transmitter is not in use for the first connection. The consolidated packets may be transmitted together when the transmitter is in use for the first connection.

In one example, an uplink grant message may be received, over a first receiver, for the first connection from the first access node. The transmitter may then be switched to transmit over the first connection upon receipt of the uplink grant message.

A first receiver may be configured to receive according to the first receive pattern for the first connection, and according to a second receive pattern for a second connection distinct from the first connection. A second receiver may be configured to receive according to a second receive pattern for a second connection distinct from the first connection.

A second aspect provides a user equipment device, comprising: a transmitter, a receiver, and a processing circuit coupled to the transmitter and receiver. The transmitter may be configured to transmit over one or more wireless networks. The receiver may be configured to receive over one or more wireless networks. The processing circuit may be configured to: (a) receive a first transmit pattern and a separate first receive pattern; (b) configure the transmitter to transmit, over a first connection with a first access node, according to the first transmit pattern for the first connection and the receiver to receive according to the receive pattern for the first connection; and/or (c) providing a first coexistence indicator to the first access node, wherein the first transmit pattern and/or first receive pattern are received in response to the first coexistence indicator.

The transmitter may facilitate dual active connections including the first connection and one or more other distinct connections.

The transmitter may use time division multiplexing (TDM) to allocate time slots according to the first transmit pattern and a second transmit pattern.

The processing circuit is further configured to: (d) consolidate packets for transmission over the first connection while the transmitter is not in use for the first connection; and/or (e) transmit the consolidated packets together when the transmitter is in use for the first connection.

A third aspect provides a method operational at an access node that facilitates wireless services to one or more user equipment (UE) devices. A first transmit pattern and a separate first receive pattern may be sent, via a first connection to a first UE device. A receiver at the access node may then be configured to receive according to the first transmit pattern for the first connection.

Similarly, a transmitter at the access node may be configured to transmit according to the first receive pattern for the first connection.

A first coexistence indicator may be subsequently received from the first UE device indicating that the first UE device supports multiple concurrent connections.

In one implementation, a second coexistence indicator may be received, via a second connection, from the first UE device. A second transmit pattern and a second receive pattern may be sent to the first UE device. The receiver at the access node may be configured to receive according to the second transmit pattern for the second connection while also receiving according to the first transmit pattern for the first connection. Similarly, a transmitter at the access node may be configured to transmit according to the second receive pattern for the second connection while also transmitting according to the first receive pattern for the first connection.

A fourth aspect provides an access node, comprising: a communication circuit and a processing circuit coupled to the communication circuit. The communication circuit, including a transmitter and a receiver, may be configured to provide wireless services to one or more user equipment (UE) devices. The processing circuit may be configured to: (a) send, via a first connection to a first UE device, a first transmit pattern and a first receive pattern; and/or (b) configure the receiver at the access node to receive according to the first transmit pattern for the first connection; (c) receive a first coexistence indicator from the first UE device indicating that the first UE device supports multiple concurrent connections. The first transmit pattern and first receive pattern may be sent in response to receiving the first coexistence indicator. The first coexistence indicator may include a second transmit pattern and/or a second receive pattern already in use by the first UE device, and the access node avoids using the second transmit pattern and second receive pattern as the first transmit pattern and first receive pattern, respectively.

DETAILED DESCRIPTION

In the following description, specific details are given to provide a thorough understanding of the described implementations. However, it will be understood by one of ordinary skill in the art that the implementations may be practiced without these specific details. For example, circuits may be shown in block diagrams in order not to obscure the implementations in unnecessary detail. In other instances, well-known circuits, structures and techniques may be shown in detail in order not to obscure the implementations.

The word "exemplary" is used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation. The term "user equipment" (UE) as used herein is meant to be interpreted broadly. For example, a "user equipment" or "UE" may include a mobile phone, a cellular phone, a smart phone, a session initiation protocol (SIP) phone, a pager, a wireless modem, a personal digital assistant, a personal information manager (PIMs), personal media players, client devices, subscriber devices, tablet computers, laptop computers, a satellite radio, a global positioning system, a multimedia device, a video device, a digital audio player (e.g., MP3 player), a camera, a game console, a tablet, and/or other mobile communication/computing devices which communicate, at least partially, through a wireless or cellular network. The term "access node" is also meant to be interpreted broadly, and includes, for example, an evolved Node B (ENB), a base station, a base transceiver station, a radio base station, a radio transceiver, a basic service set (BSS), an extended service set (ESS), a network access point, and/or a network connectivity node that may be part of a radio access network and provides wireless network connectivity to one or more UEs.

There is a need for methods, apparatus, and/or systems that allow a single radio to be used to establish two or more simultaneous connections from a mobile device.

Overview

A first aspect provides for dual active connections between a user equipment (UE) and a plurality of distinct network access nodes by sharing at least one of a transmitter and/or receiver of the UE.

A second aspect provides for improving performance of the shared transmitter and/or receiver by using distinct transmit patterns and/or distinct receive patterns for each of the connections over the transmitter and/or receiver.

A third aspect provides for the UE to send a coexistence indicator to the one or more network access nodes to indicate the transmit pattern and/or receive pattern to use for each of the dual connections.

Exemplary Network Operating Environment

Figure 1:
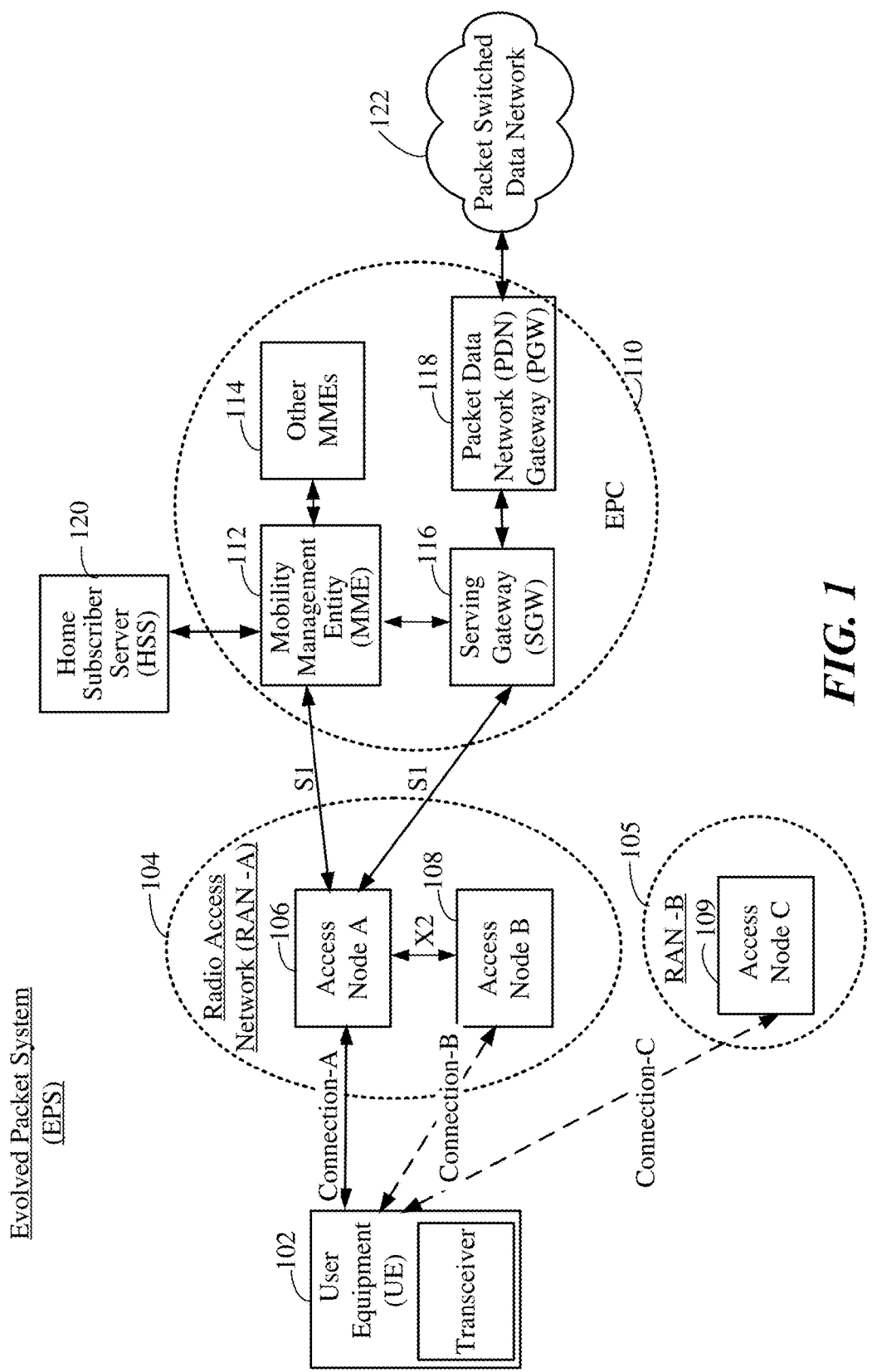
FIG. 1 is a diagram illustrating an exemplary next generation communication network architecture, such as an evolved packet system (EPS) according to some aspects and/or embodiments described herein.

FIG. 1 is a diagram illustrating an exemplary next generation communication network architecture, such as an evolved packet system (EPS) 100 according to some aspects and/or embodiments described herein. The EPS 100 may include one or more user equipment (UE) 102, a first Radio Access Network (RAN) 104 (e.g., Evolved Universal Mobile Telecommunication System (UMTS) Terrestrial Radio Access Network (E-UTRAN)), an Evolved Packet Core (EPC) 110, a Home Subscriber Server (HSS) 120, and a Packet Switched Network 122. As shown, the EPS 100 provides packet-switched services, however, as those skilled in the art will readily appreciate, the various concepts presented throughout this disclosure may be extended to networks providing circuit-switched services.

The first RAN-A 104 may include one or more access nodes 106 and 108 (e.g., evolved Node Bs or ENBs). Additionally, other access nodes 109, coupled to other RANs and/or other MMEs may also serve to provide connectivity to the UE 102. In this example, a first access node 106 provides user plane and control plane protocol terminations toward a user equipment (UE) 102.

In one example, the first access node 106 may be communicatively coupled to a second access node 108 on the same RAN 104 via a backhaul interface X2. The first access node 106 may serve as an access point to the EPC 110 for the UE 102. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, an entertainment device, a medical device, industrial equipment, actuator/sensor component, automotive component, metering equipment, IoE/IoT devices, or some other suitable terminology.

The first access node 106 may be connected by an interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user internet protocol (IP) packets may be transferred through the Serving Gateway 116, which itself is connected to the PDN Gateway 118. The PDN Gateway 118 may provide the UE internet protocol (IP) address allocation as well as other functions. The PDN Gateway 118 is connected to the packet switched network 122. The packet switched network 122 may include the Internet, an intranet, an IP Multimedia Subsystem (IMS), and a PS Streaming Service (PSS).

The access nodes A 106 and B 108 typically communicate with each other via an X2 interface. The access nodes 106 and 108 communicate with the EPC 110 (including the MME 112 and SGW 116) via an S1 interface.

In existing wireless communication networks, such as a 4G network or Long Term Evolution (LTE) network, Non-Access Stratum (NAS) protocols form the highest stratum of the control plane between the user equipment (UE) and MME. NAS protocols support the mobility of the UE and the session management procedures to establish and maintain IP connectivity between the UE and a PDN gateway (PGW).

In one example, the EPS 100 may utilize an EPS Session Management (ESM) protocol which provides procedures for the handling of EPS bearer contexts. Together with a bearer control provided by an Access Stratum, it provides the control of user plane bearers. The transmission of ESM messages is suspended during EPS Mobility Management (EMM) procedures except for the attach procedure.

In one example, the EPS 100 may utilize an EPS Mobility Management (EMM) protocol which provides procedures for the control of mobility when the User Equipment (UE) uses, for example, an Evolved UMTS Terrestrial Radio Access Network (E-UTRAN). It also provides control of security for the NAS protocols.

According to one feature, the UE 102 may include a transceiver (i.e., transmitter and receiver circuit) which is adapted to maintain two concurrent connections (known as dual active) over the same first RAN-A 104 or with a different second RAN-B 105. In dual active operation, the UE 102 may be concurrently connected with two access nodes. The two access nodes may belong to two distinct RATs or two frequencies of the same RAT. The dual active can be extended to multiple active (i.e., more than two concurrent connections over a plurality of access nodes).

Dual active is useful for dual connectivity as the UE 102 is able to establish a link to two cells simultaneously. Traditionally, dual active on a UE has been achieved by using two or more transceivers (e.g., two transmit radio circuits). However, concurrent transmissions of dual transmitter radios may lead to inter-modulation issue, i.e., a linear combination of multiple transmitting frequencies may fall into the receiving frequency band of a radio network (e.g., radio access technology or RAT) in the vicinity of the UE. Resolving these interference issues increases cost and size of a UE transceiver. Using dual transmitter radios also has the disadvantage of requiring additional space and a longer transmit circuit chain.

Figure 2:
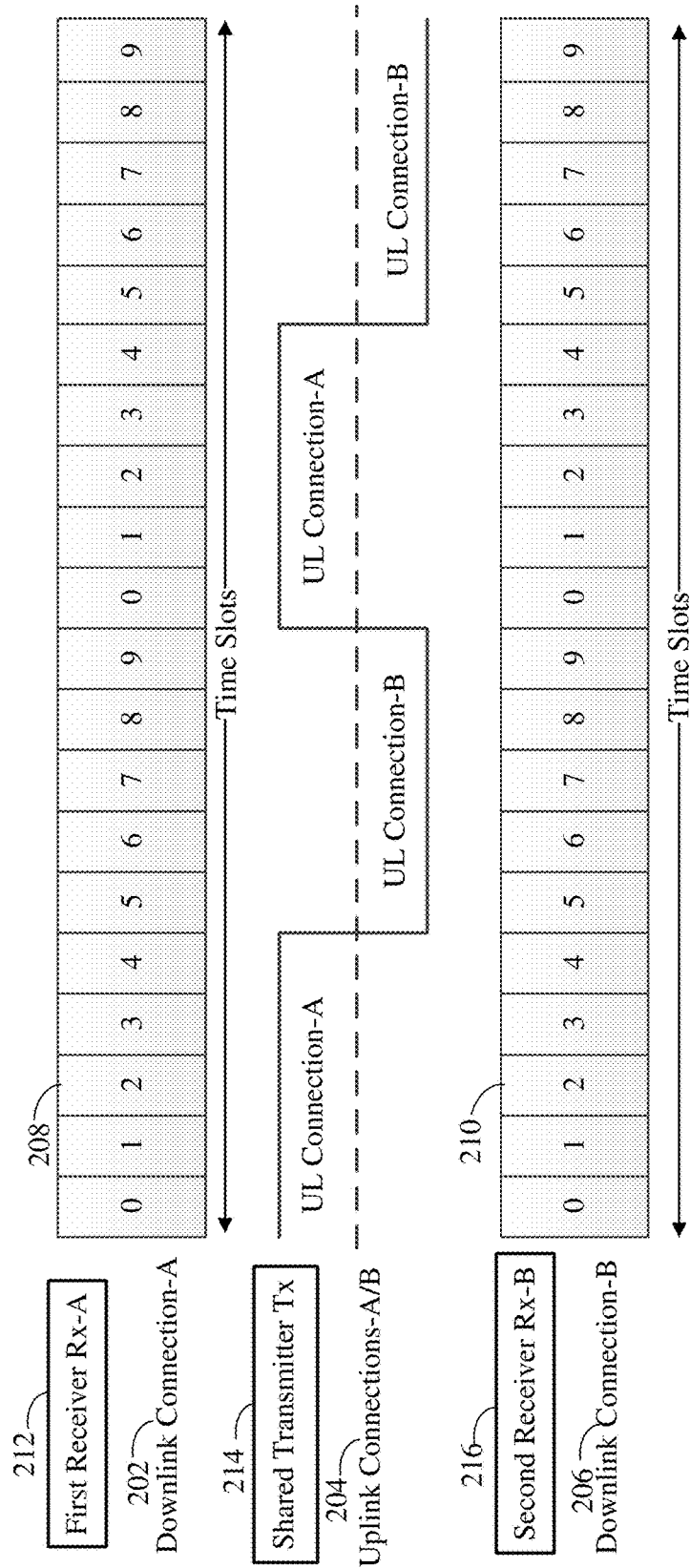
FIG. 2 illustrates a possible solution for dual connectivity by sharing a transmitter radio for the uplink transmissions (i.e., from a UE device to two or more access nodes) according to some aspects and/or embodiments described herein.

FIG. 2 illustrates a possible solution for dual connectivity by sharing a transmitter radio for the uplink transmissions (i.e., from the UE device 102 to two or more access nodes A and B) according to some aspects and/or embodiments described herein. For instance, a device (such as a transceiver in a UE) may include a dual connectivity transceiver that serves to establish a first connection A (comprising a first uplink connection A and a first downlink connection A) and a second connection B (comprising a second uplink connection B and a second downlink connection B). In one example, the dual connectivity transceiver may include a first receiver RX-A 212 that serves to establish a first downlink connection A 202, a second receiver RX-B 216 that serves to establish a second downlink connection B 206, and a single/shared transmitter Tx 214 that serves to establish a shared uplink connection A/B 204. The first receiver Rx-A 212 may serve to receive/listen (downlink) on every defined time slot 208 over the first downlink connection A 202. The second receiver Rx-B 216 may similarly serve to receive/listen (downlink) on every defined time slot 210 over the second downlink connection B 206. The single transmitter Tx 214 may be shared by the first connection-A and second connection-B to transmit data (uplink) from the device. For example, the single/shared transmitter Tx 214 may be shared using time division multiplexing (TDM) wherein the transmitter Tx 214 is alternatively used by the first connection-A and second connection-B during alternating periods. Transmitter sharing works so long as the uplink requirements for all connections can be satisfied by the single/shared transmitter 214.

Sharing a transmitter requires switching between the first connection A and the second connection B. The switching time between connections is critical to the performance of transmitter sharing. The switching time may be dependent on tuning a local oscillator (LO)/phase-locked loop (PLL) from one frequency to another frequency, and updating registers of a mobile station modem (MSM) or wireless transmitter (WTR) chip. After the transmitter is tuned, the phase of the transmitter LO/PLL may not be continuous (or synchronous) with previous transmissions. Thus, these random phase changes when switching channels impacts the channel estimation of an access node (e.g., NodeB). If the transmitter can have two independent LO/PLL for transmissions, the LO/PLL tuning time can be further reduced to, for example, less than 0.1 milli-seconds (ms) and the random phase issue can be avoided.

Improvements to In-Device Coexistence for Single Radio Dual Active

The 3GPP Standard defined in-device coexistence (IDC) to avoid in-device radio frequency (RF) coexistence issues between, for example, LTE and WiFi/Bluetooth by time division multiplexing (TDM) or frequency division multiplexing (FDM). Two TDM solutions were defined: discontinuous reception (DRX) and subframe pattern. If both an UE device and a serving network support in-device coexistence (IDC), in case the RF coexistence issue cannot be resolved by the UE device itself, the UE device sends a message (e.g., RRC InDeviceCoexIndication message) to the access node (e.g., eNB) requesting a discontinuous receive (DRX) or subframe pattern. The DRX or subframe pattern indicates the periods or slots of time during which a device may receive or send transmissions. For instance, rather than continuously monitoring a channel, a receiver may be configured to only listen/receive transmissions (downlink) during specified time periods (e.g., time slots), thereby conserving power.

Figure 3:
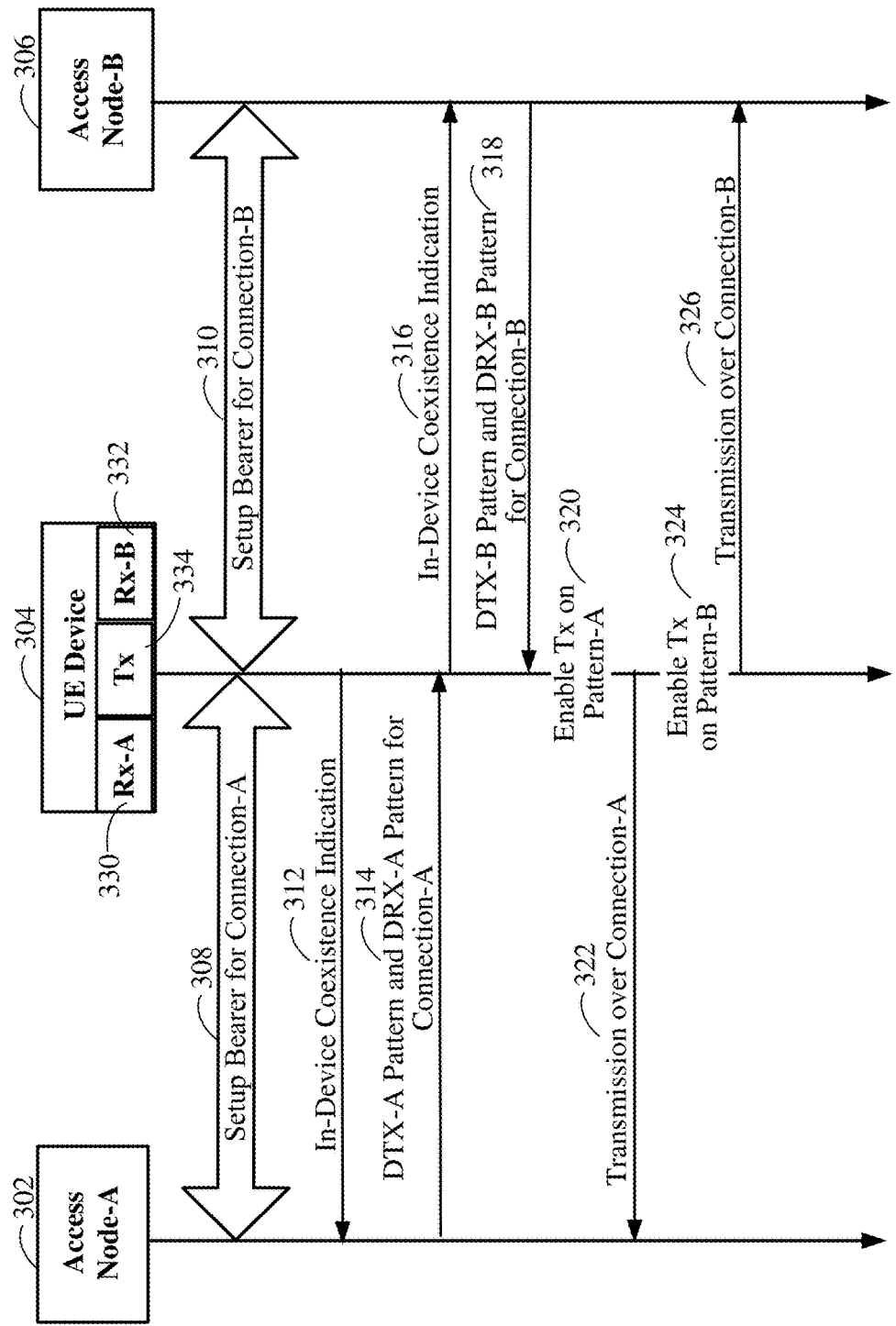
FIG. 3 illustrates a first aspect in which single radio dual active may be implemented using separate discontinuous transmit (DTX) and discontinuous receive (DRX) patterns according to some aspects and/or embodiments described herein.

FIG. 3 illustrates a first aspect in which single radio dual active operation may be implemented using separate discontinuous transmit (DTX) and discontinuous receive (DRX) patterns according to some aspects and/or embodiments described herein.

In conventional implementations, the same DTX and DRX patterns are used by a UE device. That is, during the DRX OFF period, the DTX is also OFF (i.e., not transmitting).

By contrast, in a two-receiver/one-transmitter UE device 304, independent DTX and DRX patterns may be used. For example, as part of setting up a first connection-A 308 with a first Access Node-A 302 and a second connection-B 310 with a second access node-B 306, the UE device 304 may send an indication 312 and 316 of in-device coexistence to each of the access nodes A 302 and B 306. Instead of requesting a single pattern from each access node (e.g., which would be used for both transmissions and reception), the in-device coexistence indications 312 and 316 act as a request from the UE device 304 to each access node A 302 and B 306 to provide distinct receiver patterns DRX-A and DRX-B and distinct transmit patterns DTX-A and DTX-B. In this example, the first access node-A 302 provides 314 a first transmit pattern (DTX-A) and a first receive pattern (DRX-A) while the second access node-B 306 provides 318 a second transmit pattern (DTX-B) and a second receive pattern (DRX-B). The UE device 304 may thus set a first receiver Rx-A 330 to listen according to the first receive pattern (DRX-A) and may set a second receiver Rx-B 332 to listen according to the second receive pattern (DRX-B). A shared transmitter 334 may be configured to switch between the first transmit pattern (DTX-A) and the second transmit pattern (DTX-B). For instance, the shared transmitter 334 may enable the use of the first transmit pattern (DTX-A) 320 to transmit 322 according to the first transmit pattern (DTX-A) over the first connection-A. Similarly, the shared transmitter 334 may enable the use of the second transmit pattern (DTX-B) 324 to transmit 326 according to the second transmit pattern (DTX-B) over the second connection-B. In one example, the UE device 304 may send an access node its existing or currently used transmit/receive patterns (or a profile identifier for such pattern(s)) to allow the access node A 302 and/or B 306 to avoid assigning or allocating the same transmit/receive pattern for a new connection. In yet another example, as part of the in-device coexistence indication 312 and 316 sent by the UE device 304, the UE device 304 may send a proposed transmit pattern(s) and/or a proposed receive pattern(s) which an access node may use to assign/allocate a transmit pattern and a receive pattern to the UE device 304. Similarly, the UE device 304 may request continuous and/or discontinuous receive/transmit patterns for a particular connection.

According to a second aspect, rather than specifying discontinuous transmit/receive patterns (DTX/DRX), separate uplink (UL) and downlink (DL) patterns may be used by the UE device 304. In this manner, the UE device may configure the first receiver Rx-A 330 to listen according to a first receive pattern (DL-A) and may set the second receiver Rx-B 332 to listen according to the second receive pattern (DL-B). The shared transmitter 334 may be configured between transmitting according to the first transmit pattern (UL-A) over the first connection-A and transmitting according to the second transmit pattern (UL-B) over the second connection-B.

Figure 4:
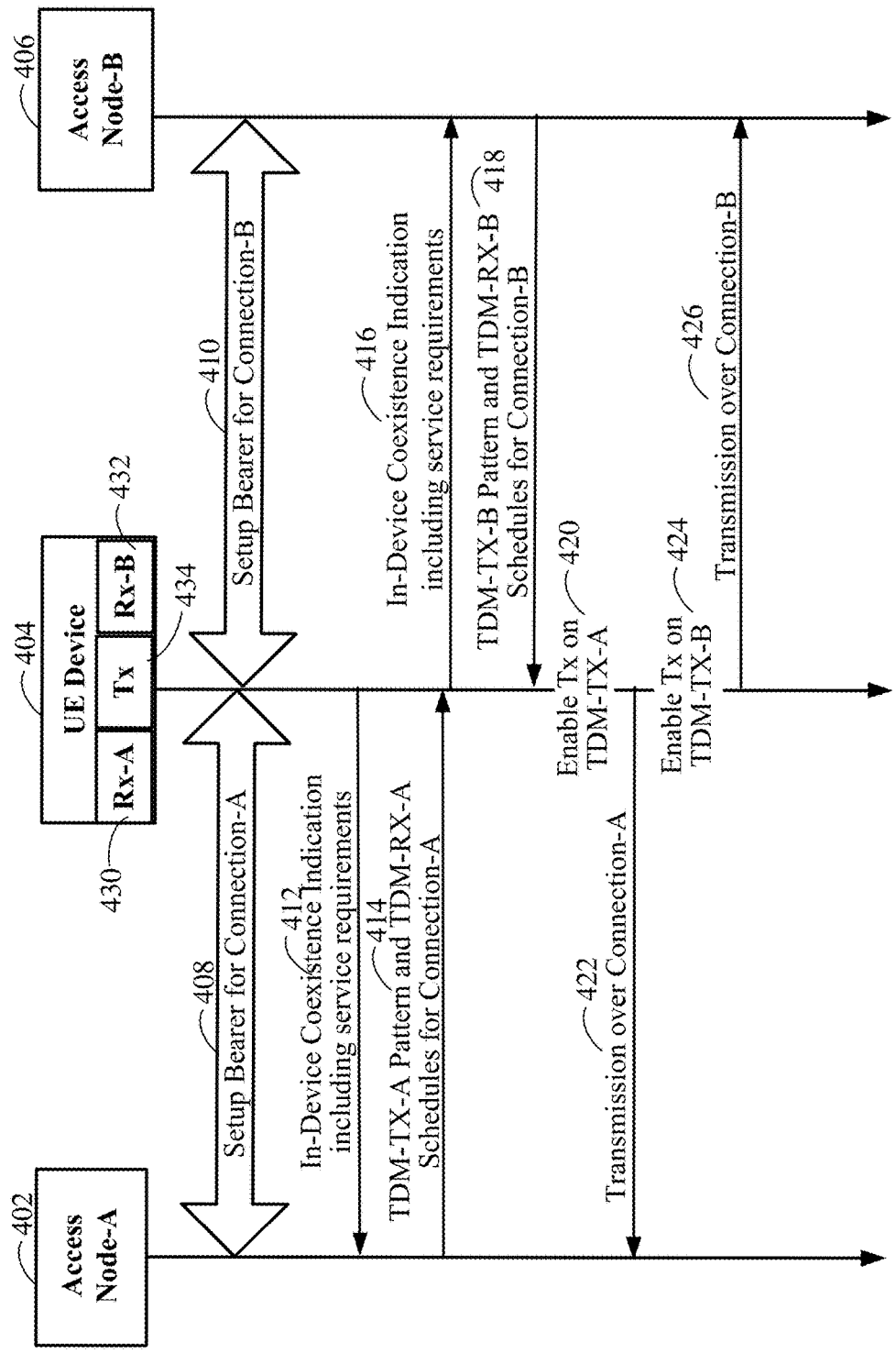
FIG. 4 illustrates a second aspect in which single radio dual active may be implemented using time division multiplexing (TDM) according to some aspects and/or embodiments described herein.

FIG. 4 illustrates a third aspect in which single radio dual active operation may be implemented using time division multiplexing (TDM) according to some aspects and/or embodiments described herein. In this implementation, a UE device 402 may setup connections A 408 and B 410 with a first access node A 402 and a second access node B 406. The two-receiver/one-transmitter UE device 402 may send an indication 412 and 416 of in-device coexistence to each of the access nodes A 402 and B 406. In this example, the in-device coexistence indications 412 and 416 act as a request from the UE device 404 to each access node A 402 and B 406 to obtain TDM schedules/allocations according to UE capabilities and service requirements. The service requirement information provided to the access nodes A 402 and B 406 may include current traffic parameters or load for the connection with the access node, traffic metrics for the connection with the access node, etc. Additionally, the service requirement information provided to the access node(s) A 402 and B 406 may include whether the UE device 404 requires concurrent radio access technologies (RATs), such as Global System for Mobile (GSM) receive (Rx), Long Term Evolution (LTE) receive (Rx).

The first access node A 402 may provide 414 a first transmit TDM schedule TDM-TX-A and a first receive TDM schedule TDM-RX-A to the UE device 404. Similarly, the second access node-B 406 may provide 418 a second transmit TDM schedule TDM-TX-B and a second receive TDM schedule TDM-RX-B to the UE device 404. The UE device 404 may thus set a first receiver Rx-A 430 to listen according to the first receive schedule TDM-RX-A and may set a second receiver Rx-B 432 to listen according to the second receive schedule TDM-RX-B. A shared transmitter 434 may be configured to switch between the first transmit schedule TDM-TX-A and the second transmit schedule TDM-TX-B. For instance, the shared transmitter 434 may enable the use of the first transmit schedule TDM-TX-A 420 to transmit 422 according to the first transmit schedule TDM-TX-A over the first connection-A. Similarly, the shared transmitter 434 may enable the use of the second transmit schedule TDM-TX-B 424 to transmit 426 according to the second transmit schedule TDM-TX-B over the second connection-B.

According to yet another aspect, the UE device 404 may provide the access nodes A 402 and B 406 with radio access technology (RAT) information for the UE device 404 when sending its in-device coexistence indicator. Previous in-device coexistence indicators have not informed the network (e.g., access nodes) the type and parameters of its concurrent RAT/CC. So, the access nodes are only aware of the hybrid automatic repeat request (HARQ) process based on the subframe pattern or DRX pattern. The time granularity in in subframe level and the DRX cycle is based on the HARQ cycle. However, the concurrent RAT/connection may have different cycles based on the type of the RAT being used by the UE device.

To support single radio dual active (SRDA) operation at a UE device, the length of a subframe pattern may be extended to the least common multiple of two cycles. The impact to LTE may be in the subframe level, e.g. LTE transmission resumes at the middle of a subframe or LTE transmission stops at middle of a subframe. With concurrent RAT/connection specific parameters, the access node could accurately know the timing for transmission sharing. In one example, the parameters provided by the UE device to an access node may include:

RAT type: GSM, cdma1x, EVDO, UTRAN FDD, UTRAN TDD, E-UTRAN FDD, E-UTRAN TDD. LTE-based (LTE-A, LTE-U, LTE-D, etc.), 5G, etc.
Frame offset
Time advance
Conflicting channel
Tolerate puncture rate and/or
Switching time.

According to yet another aspect, separate patterns (e.g., DTX/DRX or UL/DL sub-frames) may be used for two RATs/connections by a UE device. In the case where multiple downlinks (DLs) are scheduled or configured by a single access node (e.g., dual connectivity) with the UE device, the DRX/DTX or sub-frame pattern for each connection can be configured by the network and the corresponding pattern for the connection can be forwarded to the additional RATs/connections via a backhaul channel or via the UE device as a configuration request. In this manner, the UE device can use patterns to coordinate across access nodes based on network configuration.

For a UE device having a single receiver and single transmitter (1Rx/1Tx), mutually exclusive receiver patterns and transmitter patterns may be assigned for two distinct RAT/connections to share the single receiver and/or single transmitter by using time division multiplexing (TDM).

Exemplary Consolidated Uplink

Figure 5:
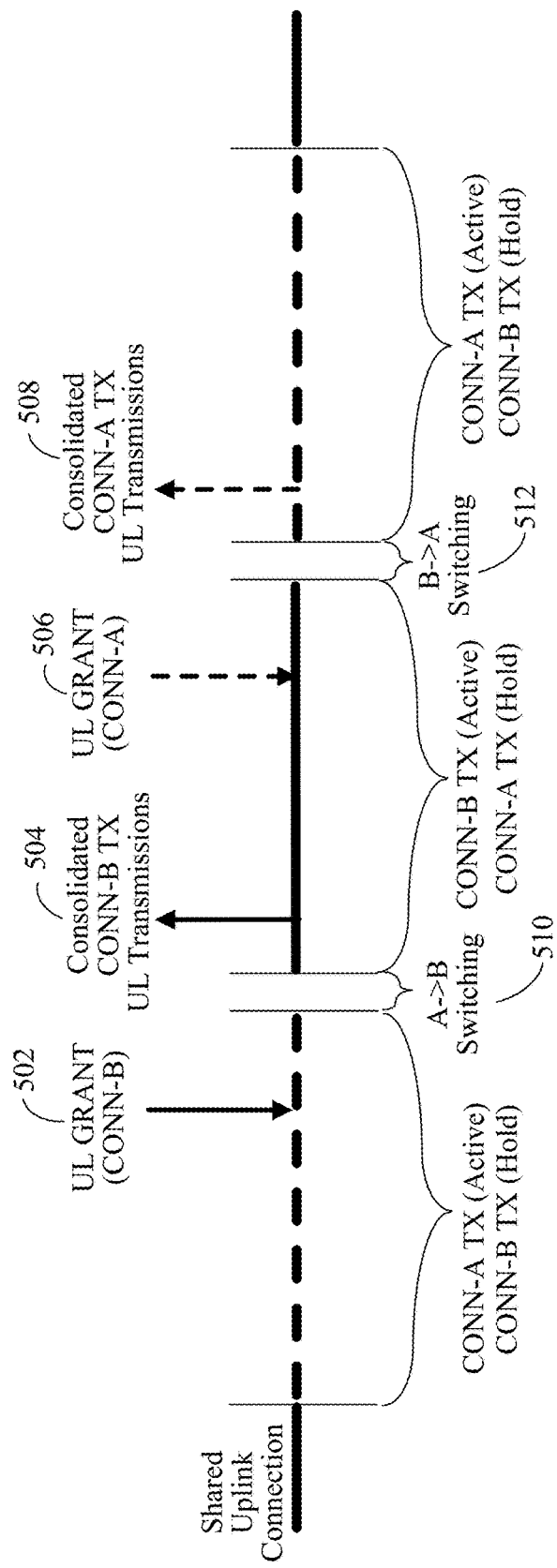
FIG. 5 illustrates an exemplary transmission of consolidated packets across different levels of a protocol stack according to some aspects and/or embodiments described herein.

FIG. 5 illustrates an exemplary transmission of consolidated packets across different levels of a protocol stack according to some aspects and/or embodiments described herein. Consolidating uplink transmissions from the UE device enables a two receiver and one transmitter (2Rx/1Tx) UE device to have similar downlink (DL) throughput performance as a two receiver and two transmitter (2Rx/2Tx) UE device.

The example in FIG. 5 illustrates a first connection CONN-A and a second connection CONN-B using a transmitter for the uplink connections from a UE device. The transmitter may support the first connection CONN-A and the second connection CONN-B by switching between the two supported connections. It should be clear that while the UE device may include additional transmitters; but such additional transmitters may be unavailable for the first connection CONN-A and/or second connection CONN-B. For example, the additional transmitter(s) may be in use for other connections or assigned to other radio access technologies (RATs). While the transmitter is transmitting (active) for the first connection CONN-A, transmission for the second connection CONN-B is placed on hold (e.g., data to be transmitted for CONN-B is buffered). While the transmitter is supporting the first connection, an access node supporting the second connection CONN-B may send an Uplink Grant message 502 over a receiver supporting the second connection CONN-B. Consequently, the transmitter is switched 510 from the first connection CONN-A to the second connection CONN-B. That is, the second connection CONN-B is made active over the transmitter and transmission for the first connection CONN-A is placed on hold (e.g., data to be transmitted for CONN-A is buffered). The transmitter may then send an uplink consolidated transmission 504 over the second connection CONN-B. The uplink consolidated transmission 504 may send all buffered transmissions for the second connection CONN-B (e.g., packets for all protocol stack layers).

Subsequently, while the transmitter is supporting the second connection, an access node supporting the first connection CONN-A may send an Uplink Grant message 506 over a receiver supporting the first connection CONN-A. Consequently, the transmitter is switched 512 from the second connection CONN-B to the first connection CONN-A. That is, the first connection CONN-A is made active over the transmitter and transmission for the second connection CONN-B is placed on hold (e.g., data to be transmitted for CONN-B is buffered). The transmitter may then send an uplink consolidated transmission 508 over the first connection CONN-A. The uplink consolidated transmission 508 may send all buffered transmissions for the first connection CONN-A (e.g., packets for all protocol stack layers).

In one example of a consolidated transmission within a Long Term Evolution (LTE) network, the UE device may transmit the following packets on the same uplink (UL) for a particular connection:

PHY:
  Physical Uplink Control Channel (PUCCH): Scheduling Request (SR), Channel Quality Indicator (CQI), ACK/NACK,
  Physical Uplink Shared Channel (PUSCH): uplink (UL) data, Channel Quality Indicator (CQI), ACK/NACK,
  Sounding Reference Signal (SRS) and Demodulation Reference Signal (DM-RS) on both PUCCH and PUSCH.
MAC CE:
  Buffer Status Report (BSR),
  Power Headroom Report (PHR).
Upper layers: Radio Link Control (RLC), Packet Data Convergence Protocol (PDCP), Data Payload.

In a UE device having one receiver and one transmitter (1Rx/1Tx) and implementing dual connectivity (DC) or device coexistence, a consolidated uplink (UL) may also improve the downlink (DL) throughput. For instance, to improve the DL throughput of a UE device with 1Rx/1Tx and dual connectivity, a mechanism similar to FIG. 5 can be used in the downlink DL, i.e. a consolidated downlink. That is, for the downlink (DL) a single receiver may be shared between two connections by switching between the connections and consolidating packets at various levels of a protocol stack so they are sent together to the UE device when the corresponding connection becomes active.

Exemplary Fast Dual Channel Indicator

Some in-device coexistence (IDC) indicators may be based on sending a Radio Resource Control (RRC) message, which is too slow for scenarios which require fast time division multiplexing (TDM) partitioning for transmit/receive (Tx/Rx), e.g. in mobility.

To speed up the IDC indication from an UE device to an access node, either of three mechanisms may be employed.

According to a first mechanism, a new UCI format may be defined for such fast IDC indication. Due to limited capacity of the Physical Uplink Control Channel (PUCCH), a UE device and access node (e.g., eNB) may pre-negotiate several TDM profiles. With these profiles, the PUCCH just needs to carry the profile ID and some dynamic parameters, e.g. frame offset, time advance, conflicting channel. That is, the profiles may allow an access node to inform a UE device of the channel allocation for TDM.

A second approach may include using a Media Access Control (MAC) Control Element (CE), e.g., as defined in 3GPP TS36.321 section 6.1.3. The IDC indication can be included in a MAC CE. The MAC CE is transmitted in any MAC PDU.

A third approach may be to add a new physical channel that may serve to support IDC between a UE device and an access node.

Exemplary User Equipment (UE) Device and Method Operational Therein

Figure 6:
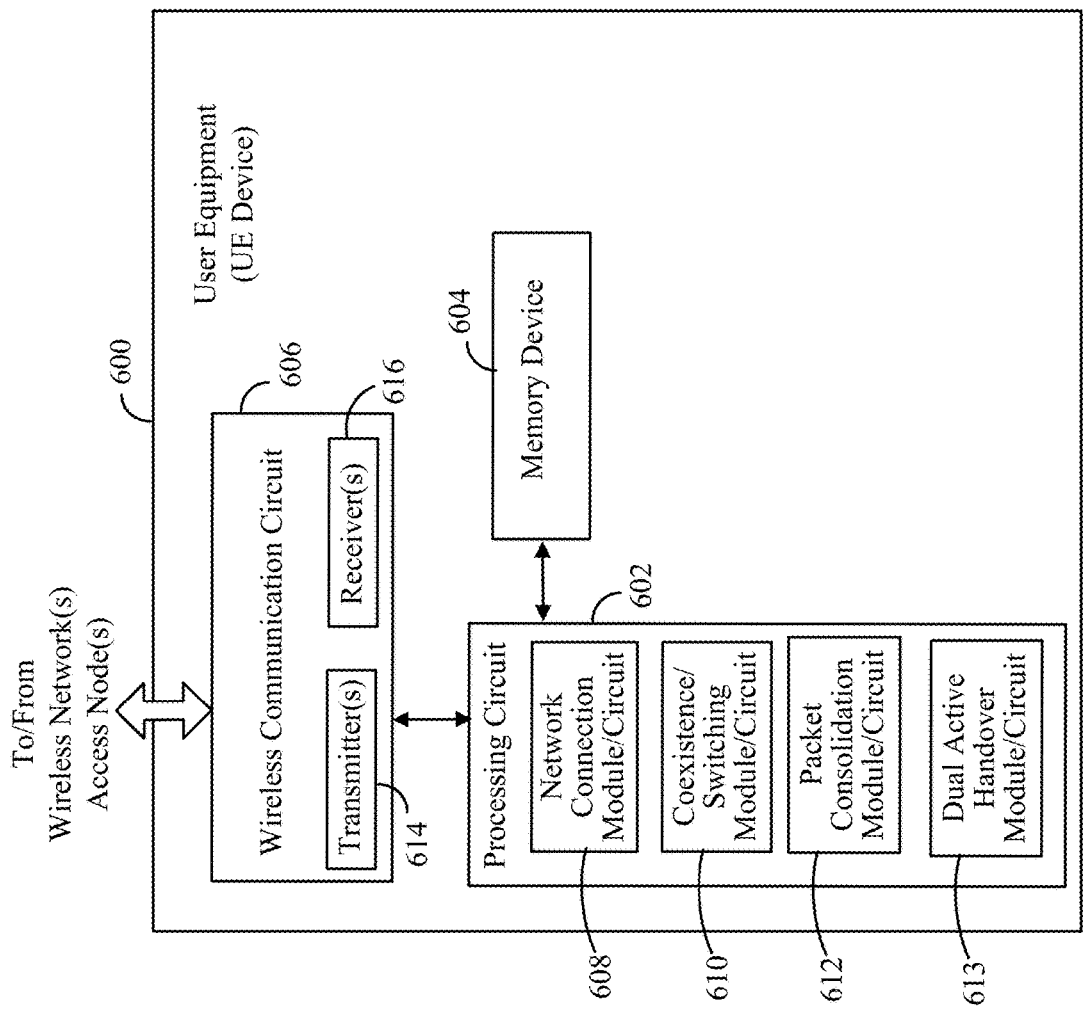
FIG. 6 illustrates a functional block diagram of at least one embodiment of a user equipment (UE) device with dual active connection capabilities over a transmitter according to some aspects and/or embodiments described herein.

FIG. 6 illustrates a functional block diagram of at least one embodiment of a user equipment (UE) device 600 with dual active connection capabilities over a transmitter according to some aspects and/or embodiments described herein. The UE device 600 may generally include a processing circuit 602 (e.g., processor, processing module, etc.) coupled to a memory device 604 (e.g., memory module, memory, etc.), and/or and a wireless communication circuit 606.

The processing circuit 602 may be configured to establish a wireless connection via the wireless communication circuit 606 to send and/or receive information from a network (e.g., from an access node). The processing circuit 602 may be coupled to the memory circuit 604 such that the processing circuit 602 can read information from, and write information to, the memory device 604. The processing circuit 602 may also include a network connection module/circuit 608 for establishing a network connection (via the wireless communication circuit 606) with one or more access nodes (e.g., eNBs). The processing circuit 602 may also include a coexistence/switching module/circuit 610 for performing the various steps of utilizing a transmitter for multiple connections over one or more networks. The processing circuit 602 may also include a packet consolidation module/circuit 612 for consolidating packets to be transmitted over a particular connection. The processing circuit 602 may also include a dual active handover module/circuit 613 for performing a handover from a first access node to a second access node while maintaining two simultaneous active connections during the handover process.

The wireless communication circuit 606 may include one or more transmitters 614 and one or more receivers 616. The one or more receiver(s) 616 may be configured to allow the user equipment device 600 to maintain two or more active connections with one or more access nodes (e.g., different cellular radio access technologies and/or different wireless technologies). In one example, a transmitter 614a may be shared to transmit packets for two or more active connections. That is, while the UE device may include a plurality of transmitters, some additional transmitters may be unavailable. For example, the additional transmitter(s) may be in use for other connections or assigned to other radio access technologies (RATs).

According to one or more features, the processing circuit 602 may be configured to perform any or all of the processes, functions, steps and/or routines related to the various UE devices described FIGS. 1-5. As used herein, the term "configured" in relation to the processing circuit 602 may refer to the processing circuit 602 being one or more of adapted, employed, implemented, or programmed to perform a particular process, function, step and/or routine according to various features described herein.

Figure 7:
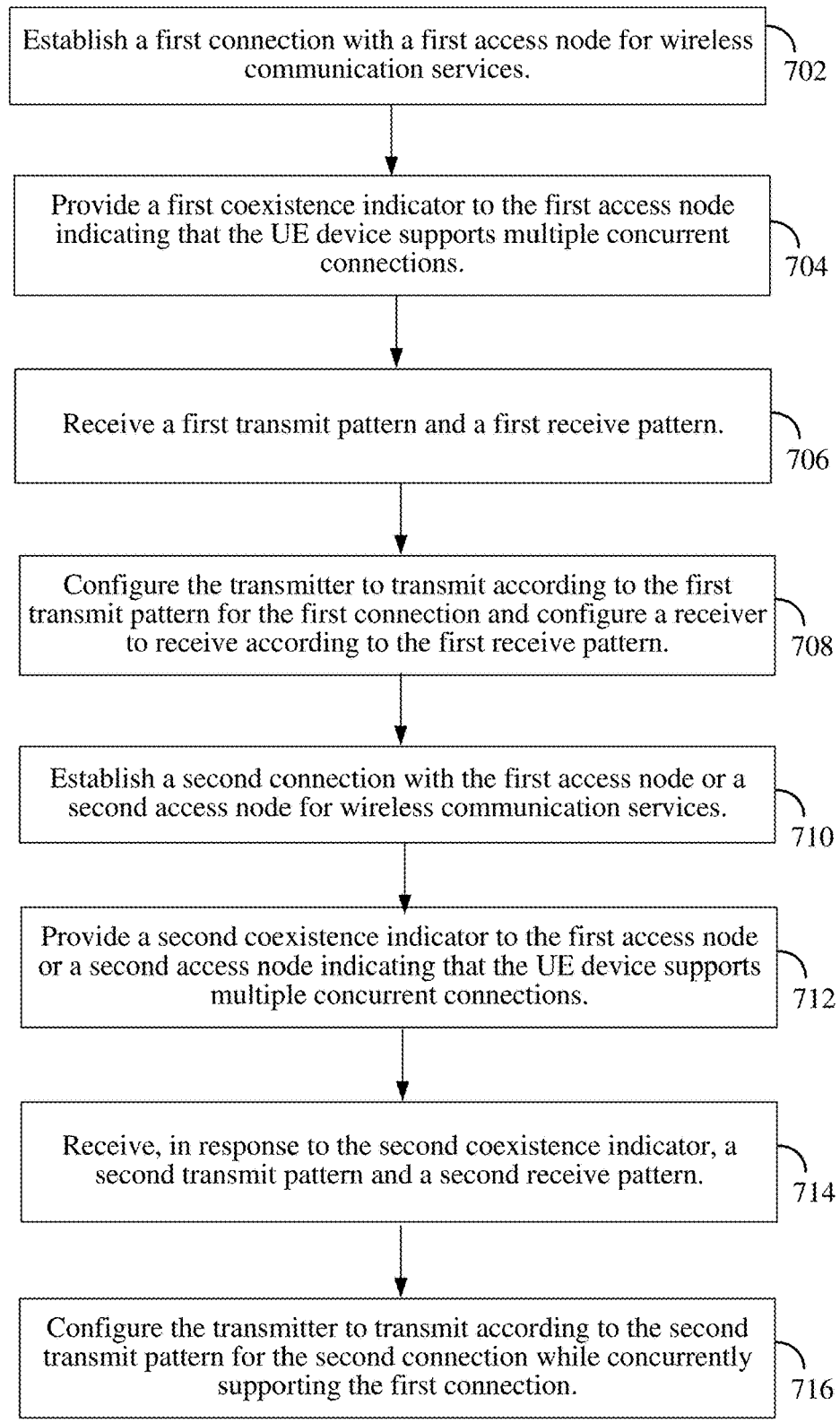
FIG. 7 is a flow diagram illustrating an example of a method operational in a UE device to facilitate dual active connections using a transmitter according to some aspects and/or embodiments described herein.

FIG. 7 is a flow diagram illustrating an example of a method operational in a UE device to facilitate dual active connections using a transmitter according to some aspects and/or embodiments described herein. In one example, this method may be operational on the UE device 600 of FIG. 6. A first connection may be established (e.g., via the wireless communication circuit 606 and/or the network connection module circuit 608) with a first access node for wireless communication services 702. For instance, in one example, the first connection with the first access node may be established for wireless communication services due to a handover from a different access node or a re-establishment of an idle connection.

The transmitter (e.g., transmitter 614) may facilitate dual active connections including the first connection and one or more distinct connections (e.g., using the network connection module/circuit 608 and/or the dual active handover module/circuit 613). Such one or more distinct connections may be, for example, radio links established with a different access node than the first connection. In one example, different radio bearers may be used for the first connection and the one or more distinct connections. A first coexistence indicator may be provided/sent to the first access node indicating that the UE device (e.g., UE device 600) supports multiple concurrent connections 704. In one example, the UE device may send an indicator (e.g., generated by the coexistence/switching module/circuit 610) to the first access node indicating that only the transmitter is available at the UE device for connections. In some implementations, the first coexistence indicator may include a proposed first transmit pattern and/or a proposed first receive pattern suggested by the UE device. In yet other implementations, the first coexistence indicator may also include an in-use transmit pattern and/or an in-use receive pattern which allows the access node to avoid such patterns when assigning or allocating patterns to the UE device.

In one implementation, the first coexistence indicator may indicate a radio access technology used by one or more other concurrent connections for the UE device. In another example, the first coexistence indicator may indicate one or more services used over one or more other concurrent connections for the UE device. In another implementation, at least one of the first transmit pattern and the first receive pattern may be based, at least partially, on the radio access technology used by the one or more other concurrent connections. This permits selecting or adjusting the transmit pattern and/or receive pattern so that other concurrent connections are not negatively impacted. For instance, if a first connection is to be used for live video streaming, then other concurrent connections for the same UE device should be setup with transmit patterns and/or receive patterns that provide enough time to the first connection to guarantee a quality of service.

The UE device may receive a first transmit pattern and a separate first receive pattern 706. In one example, the first transmit pattern may be distinct from the first receive pattern. In another example, the first transmit pattern and the first receive pattern may be the same. In one example, the first transmit pattern may indicate that the transmitter at the UE device should be configured to intermittently transmit on behalf of the first connection. In one example, the first receive pattern may indicate that a receiver at the UE device should be configured to always receive on behalf of the first connection.

In various examples, the transmit patterns may be pre-configured (e.g., static or predefined), dynamically configured (e.g., defined or selected by an access node), and/or reconfigurable. According to yet another aspect, a pattern may have additional related properties that may be conveyed to the UE device, such as whether the particular transmit and/or receive pattern is required, prohibited, and/or allowed but not required.

In one example, the transmit and/or receive patterns may be a function of the service requirements of the UE device, e.g., a voice pattern may be on/off with a 20 ms cycle (for instance, on for 2 ms, off for 18 ms). Other service requirements may be periodic or more irregular. They can be determined, for instance, by a quality of service identifier of the bearer for the particular traffic.

The transmitter may be configured to transmit according to the first transmit pattern for the first connection and a receiver may be configured to receive according to the first receive pattern for the first connection 708.

A second connection may also be established with the first access node or a second access node for wireless communication services 710. A second coexistence indicator may be provided/sent by the UE device to the first access node or a second access node indicating that the UE device supports multiple concurrent connections 712.

In response to the second coexistence indicator, the UE device may receive a second transmit pattern and a second receive pattern 714. The transmitter may be configured to transmit according to the second transmit pattern for the second connection while concurrently supporting the first connection 716.

The transmitter may use time division multiplexing (TDM) to allocate time slots according to the first transmit pattern and second transmit pattern.

In one example, the first connection and second connection may be wireless connections over a single radio access network. In another example, the first connection and second connection may be wireless connections over different radio access networks.

In some implementations, packets for transmission over the first connection may be consolidated, queued, and/or buffered (e.g., under the control of the packet consolidation module/circuit 612) while the transmitter is not allocated to the first connection. The consolidated packets may be transmitted together when the transmitter is allocated to the first connection. The consolidated packets may include packets from multiple layers of a protocol stack.

The UE device may receive, over a first receiver (e.g., from among receivers 616), an uplink grant message for the first connection from the access node. As a result, the UE device may switch the transmitter to transmit over the first connection upon receipt of the uplink grant message.

In one example, the first connection and second connection may be established by sharing a receiver at the user equipment device.

In another example a first receiver of the UE device may be configured to receive according to the first receive pattern for the first connection and a second receiver may be configured to receive according to the second receive pattern for the second connection, where the second connection may be distinct from the first connection.

In yet another example, a first receiver may be configured to receive according to the first receive pattern for the first connection, and receive according to the second receive pattern for the second connection.

Exemplary Access Node Device and Method Operational Therein

Figure 8:
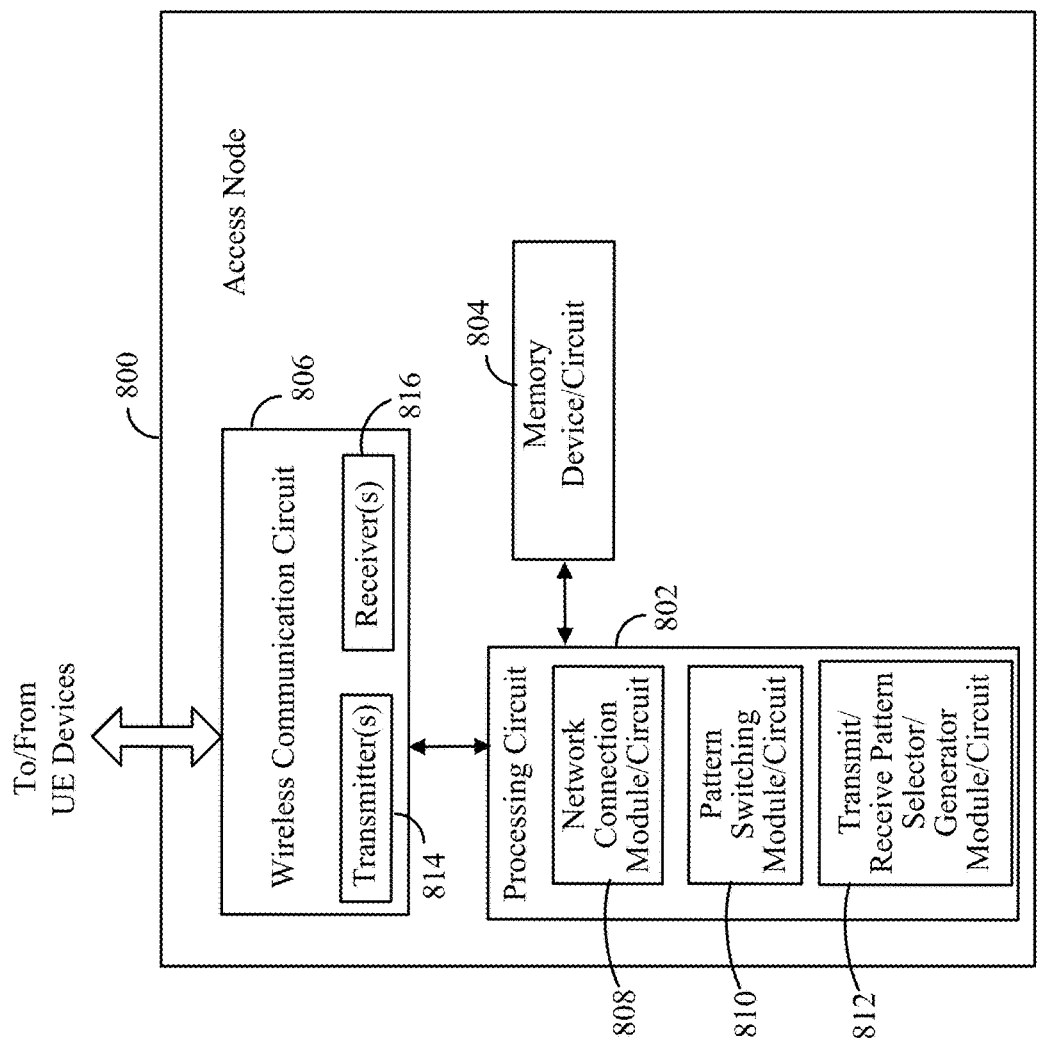
FIG. 8 illustrates a functional block diagram of at least one embodiment of an access node adapted to facilitate dual active connection capabilities over a transmitter of a UE device according to some aspects and/or embodiments described herein.

FIG. 8 illustrates a functional block diagram of at least one embodiment of an access node 800 adapted to facilitate dual active connection capabilities over a transmitter of a UE device according to some aspects and/or embodiments described herein. The access node 800 may generally include a processing circuit 802 (e.g., processor, processing module, etc.) coupled to a memory device 804 (e.g., memory module, memory, etc.), and/or and a wireless communication circuit 806.

The processing circuit 802 may be configured to establish a wireless connection via the wireless communication circuit 806 to send and/or receive information from a network (e.g., from an access node). The processing circuit 802 may be coupled to the memory circuit 804 such that the processing circuit 802 can read information from, and write information to, the memory device 804. The processing circuit 802 may also include a network connection module/circuit 808 for establishing a network connection (via the wireless communication circuit 806) with one or more access nodes (e.g., eNBs). The processing circuit 802 may also include a pattern switching module/circuit 810 for switching between patterns thereby facilitating a UE device to maintain multiple connections using a single transmitter. The processing circuit 802 may also include a transmit/receive pattern selector/generator module/circuit 812 for selecting, obtaining, generating, and/or maintaining transmit/receive patterns for the UE devices served.

The wireless communication circuit 806 may include one or more transmitters 814 and one or more receivers 816. The one or more receiver(s) 816 may be configured to allow the access node 800 to maintain two or more active connections with one or more user equipment devices. The transmitter 814 may be shared to transmit packets for two or more active connections.

According to one or more features, the processing circuit 802 may be configured to perform any or all of the processes, functions, steps and/or routines related to the various access nodes described FIGS. 1-5. As used herein, the term "configured" in relation to the processing circuit 802 may refer to the processing circuit 802 being one or more of adapted, employed, implemented, or programmed to perform a particular process, function, step and/or routine according to various features described herein.

Figure 9:
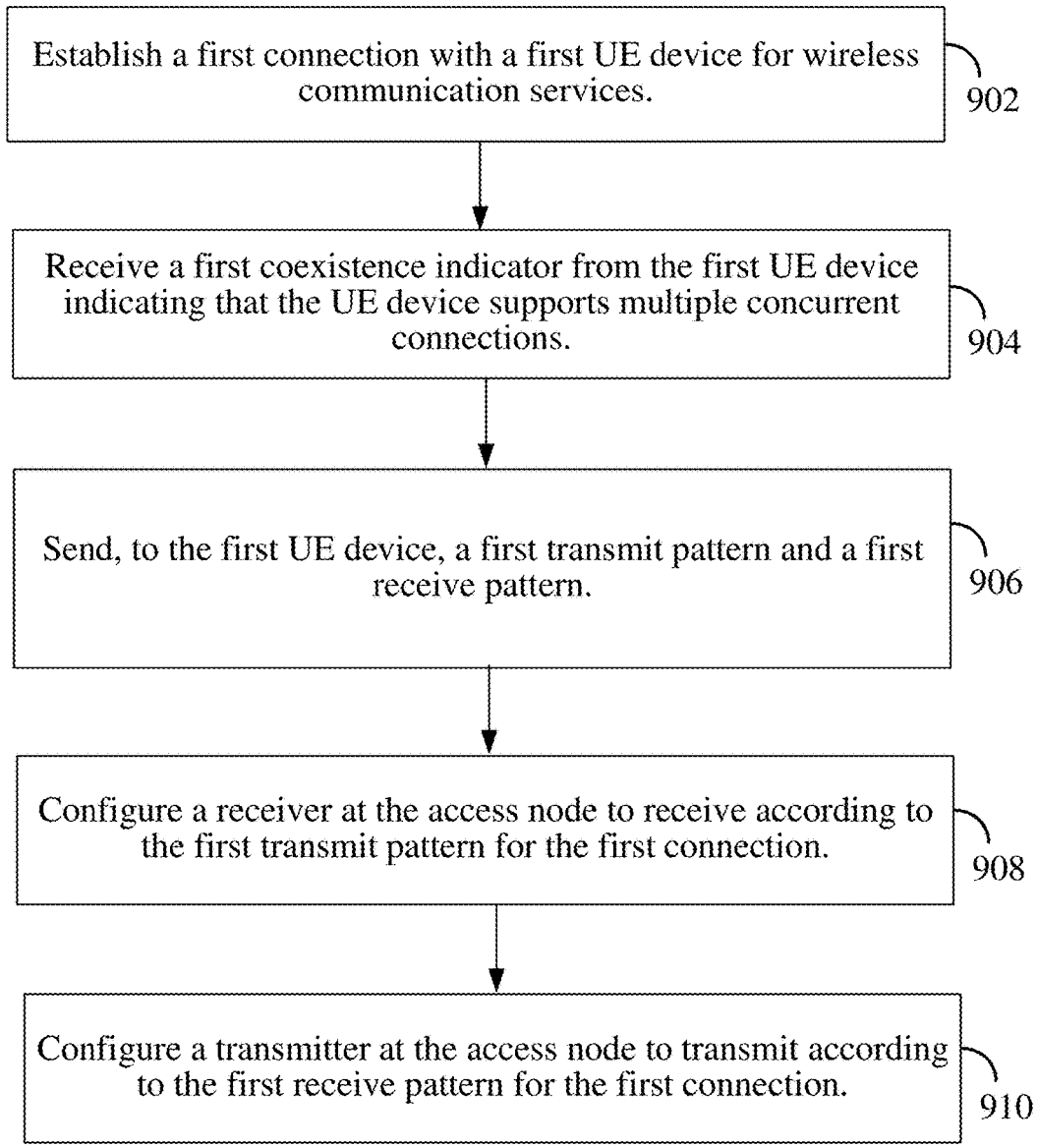
FIG. 9 is a flow diagram illustrating an example of a method operational in a access node to facilitate dual active connections by UE devices using a transmitter according to some aspects and/or embodiments described herein.

FIG. 9 is a flow diagram illustrating an example of a method operational in an access node to facilitate dual active connections by UE devices using a transmitter according to some aspects and/or embodiments described herein. In one example, this method may be operational on the access node 800 of FIG. 8). The access node 800 may establish a first connection (e.g., via the wireless communication circuit 806 and the network connection module/circuit 808) with a first UE device for wireless communication services 902. Additionally, the access node may receive a first coexistence indicator (e.g., via the receiver 816) from the first UE device indicating that the UE device supports multiple concurrent connections 904. In one example, the first coexistence indicator may indicate that only one transmitter is available at the first UE device for connections.

The access node may send, to the first UE device, a first transmit pattern and a first receive pattern 906 (e.g., which may be selected, obtained, and/or generated by the transmit/receive pattern selector/generator module/circuit 812). In one example, the first transmit pattern may be distinct from the first receive pattern. In another example, the first transmit pattern and the first receive pattern are the same pattern. In yet another example, the first receive pattern may indicate that a receiver at the first UE device should be configured to always receive on behalf of the first connection. In additional example, first transmit pattern may indicate that a transmitter at the first UE device should be configured to intermittently transmit on behalf of the first connection.

The access node may then configure a receiver at the access node to receive according to the first transmit pattern for the first connection 908. Similarly, the access node may also configure a transmitter at the access node to transmit according to the first receive pattern for the first connection 910.

Additionally, the access node may also establish a second connection (e.g., via the network connection module/circuit 808 and/or the wireless communication circuit 806) with the first UE device for wireless communication services. A second coexistence indicator may be received from the first UE device indicating that the UE device supports multiple concurrent connections. The access node may send, to the first UE device, a second transmit pattern and a second receive pattern that. Subsequently, the access node may configure (e.g., via the pattern switching module/circuit 810) the receiver at the access node to receive according to the second transmit pattern for the second connection while also receiving according to the first transmit pattern for the first connection.

Other Considerations

One or more of the components, steps, features and/or functions illustrated in FIGS. 1, 2, 3, 4, 5, 6, 7, 8, and/or 9 may be rearranged and/or combined into a single component, step, feature or function or embodied in several components, steps, or functions. Additional elements, components, steps, and/or functions may also be added without departing from the present disclosure.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

A processing circuit, as described herein (e.g., processing circuits 602, 802 and/or 1002), may comprise circuitry configured to implement desired programming provided by appropriate media in at least one embodiment. For example, a processing circuit may be implemented as one or more of a processor, a controller, a plurality of processors and/or other structure configured to execute executable instructions including, for example, software and/or firmware instructions, and/or hardware circuitry. Embodiments of a processing circuit may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit are for illustration and other suitable configurations within the scope of the present disclosure are also contemplated.

As described herein above, memory circuit, such as memory circuits 604, 804 and/or 1004, may represent one or more devices for storing programming and/or data, such as processor executable code or instructions (e.g., software, firmware), electronic data, databases, or other digital information. A memory circuit may be any available media that can be accessed by a general purpose or special purpose processor. By way of example and not limitation, memory circuit may include read-only memory (e.g., read-only memory ROM, erasable programmable ROM (EPROM), electrically erasable programmable ROM (EEPROM)), random access memory (RAM), magnetic disk storage mediums, optical storage mediums, flash memory devices, and/or other non-transitory computer-readable mediums for storing information.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of non-transitory storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the disclosure described herein can be implemented in different systems without departing from the disclosure. It should be noted that the foregoing embodiments are merely examples and are not to be construed as limiting the disclosure. The description of the embodiments is intended to be illustrative, and not to limit the scope of the disclosure. As such, the present teachings can be readily applied to other types of apparatuses and many alternatives, modifications, and variations will be apparent to those skilled in the art.

What is claimed is:

1. A method operational on a user equipment (UE) device for facilitating a dual active connections, comprising:
    receiving a first transmit pattern and a separate first receive pattern;
    receiving a second transmit pattern and a separate second receive pattern;
    configuring a transmitter to transmit, over a first connection with a first access node, according to the first transmit pattern for the first connection and a first receiver to receive according to the first receive pattern for the first connection;
    configuring the transmitter to transmit according to the second transmit pattern for a second connection while concurrently supporting the first connection;
    providing a first coexistence indicator to the first access node, wherein the first transmit pattern and the separate first receive pattern are received in response to the first coexistence indicator; and
    providing, via a second connection, a second coexistence indicator to the first access node or a second access node, wherein the second transmit pattern and the separate second receive pattern are received in response to the second coexistence indicator.

2. The method of claim 1,
    establishing the first connection with the first access node for wireless communication services due to a handover from a different access node or a re-establishment of an idle connection.

3. The method of claim 1, further comprising:
    providing a first coexistence indicator to the first access node, wherein the first transmit pattern and/or the first receive pattern are received in response to the first coexistence indicator.

4. The method of claim 3, wherein the first coexistence indicator indicates at least one of:
    (a) that the UE device supports multiple concurrent connections; or
    (b) a proposed first transmit pattern and/or a proposed first receive pattern.

5. The method of claim 3, wherein the first coexistence indicator indicates a radio access technology used by one or more concurrent connections for the UE device.

6. The method of claim 5, wherein at least one of the first transmit pattern and the first receive pattern is based, at least partially, on the radio access technology used by the one or more concurrent connections.

7. The method of claim 3, wherein the first coexistence indicator indicates one or more services used over one or more concurrent connections for the UE device.

8. The method of claim 1, further comprising:
    configuring the transmitter to facilitate dual active connections including the first connection and one or more other distinct connections including the second connection.

9. The method of claim 8, wherein the first connection and the one or more other distinct connections including the second connection are with distinct access nodes or use distinct radio access technologies.

10. The method of claim 1, wherein the transmitter is configured to transmit over the first connection and the second connection according to the first transmit pattern and the second transmit pattern, and the first transmit pattern is a time division multiplex (TDM) schedule indicating allocated time slots for the first connection and the second transmit pattern is a TDM schedule indicating distinct allocated time slots for the second connection.

11. The method of claim 1, further comprising:
    consolidating packets for transmission over the first connection while the transmitter is not in use for the first connection; and
    transmitting the consolidated packets together when the transmitter is in use for the first connection.

12. The method of claim 1, further comprising
    receiving, over a first receiver, an uplink grant message for the first connection from the first access node; and
    switching the transmitter to transmit over the first connection upon receipt of the uplink grant message.

13. The method of claim 1, further comprising:
configuring a second receiver to receive according to the second receive pattern for the second connection distinct from the first connection.

14. The method of claim 1, further comprising:
configuring the first receiver to receive according to the first receive pattern for the first connection, and according to the second receive pattern for the second connection distinct from the first connection.

15. The method of claim 1, wherein the second coexistence indicator comprises an indication that the UE device supports multiple connections.

16. A method operational on a user equipment (UE) device for facilitating a dual active connections, comprising:
receiving a first transmit pattern and a separate first receive pattern;
receiving a second transmit pattern and a separate second receive pattern;
configuring a transmitter to transmit, over a first connection with a first access node, according to the first transmit pattern for the first connection and a first receiver to receive according to the first receive pattern for the first connection;
configuring the transmitter to transmit according to the second transmit pattern for a second connection while concurrently supporting the first connection; and
providing an indicator to the first access node indicating that only the transmitter is available at the UE device for connections.

17. A user equipment device, comprising:
a transmitter configured to transmit over one or more wireless networks;
a receiver configured to receive over one or more wireless networks; and
a processing circuit coupled to the transmitter and receiver and configured to:
receive a first transmit pattern and a separate first receive pattern;
receive a second transmit pattern and a separate second receive pattern;
configure the transmitter to transmit, over a first connection with a first access node, according to the first transmit pattern for the first connection and the receiver to receive according to the first receive pattern for the first connection;
configure the transmitter to transmit according to the second transmit pattern for a second connection while concurrently supporting the first connection; and
wherein the processing circuit is further configured to:
provide a first coexistence indicator to the first access node, wherein the first transmit pattern and/or the first receive pattern are received in response to the first coexistence indicator and provide, via a second connection, a second coexistence indicator to the first access node or a second access node,
wherein the second transmit pattern and the separate second receive pattern are received in response to the second coexistence indicator.

18. The user equipment device of claim 17, wherein the transmitter facilitates dual active connections including the first connection and one or more other distinct connections including the second connection.

19. The user equipment device of claim 17, wherein the transmitter is configured to transmit over the first connection and the second connection according to the first transmit pattern and the second transmit pattern, and the first transmit pattern is a time division multiplex (TDM) schedule indicating allocated time slots for the first connection and the second transmit pattern is a TDM schedule indicating distinct allocated time slots for the second connection.

20. The user equipment device of claim 17, wherein the processing circuit is further configured to:
consolidate packets for transmission over the first connection while the transmitter is not in use for the first connection; and
transmit the consolidated packets together when the transmitter is in use for the first connection.

21. A method operational at an access node that provides wireless services to one or more user equipment (UE) devices, comprising:
sending, via a first connection to a first UE device, a first transmit pattern and a separate first receive pattern;
sending, to the first UE device, a second transmit pattern and a second receive pattern;
configuring a receiver at the access node to receive according to the first transmit pattern for the first connection;
configuring the receiver at the access node to receive according to the second transmit pattern for a second connection while also receiving according to the first transmit pattern for the first connection;
receiving a first coexistence indicator from the first UE device indicating that the first UE device supports multiple concurrent connections; and
receiving, via the second connection, a second coexistence indicator from the first UE device
wherein sending, to the first UE device, the second transmit pattern and the second receive pattern is in response to the second coexistence indicator.

22. The method of claim 21, further comprising:
configuring a transmitter at the access node to transmit according to the first receive pattern for the first connection.

23. The method of claim 21, further comprising:
configuring a transmitter at the access node to transmit according to the second receive pattern for the second connection while also transmitting according to the first receive pattern for the first connection.

24. An access node, comprising:
a communication circuit, including a transmitter and a receiver, configured to provide wireless services to one or more user equipment (UE) devices; and
a processing circuit coupled to the communication circuit and configured to:
send, via a first connection to a first UE device, a first transmit pattern and a first receive pattern;
send, to the first UE device, a second transmit pattern and a second receive pattern;
configure the receiver at the access node to receive according to the first transmit pattern for the first connection;
configure the receiver at the access node to receive according to the second transmit pattern for a second connection while also receiving according to the first transmit pattern for the first connection
receive a first coexistence indicator from the first UE device indicating that the first UE device supports multiple concurrent connections; and
receive, via the second connection, a second coexistence indicator from the first UE device, wherein sending, to the first UE device, the second transmit pattern and the second receive pattern is in response to the second coexistence indicator.

25. The access node of claim 24, wherein the first transmit pattern and first receive pattern are sent in response to receiving the first coexistence indicator.

26. The access node of claim 24, wherein the first coexistence indicator includes a second transmit pattern and/or a second receive pattern already in use by the first UE device, and the access node avoids using the second transmit pattern and second receive pattern as the first transmit pattern and first receive pattern, respectively.

27. A user equipment device, comprising:
- a transmitter configured to transmit over one or more wireless networks;
- a receiver configured to receive over one or more wireless networks; and
- a processing circuit coupled to the transmitter and receiver and configured to:
  - receive a first transmit pattern and a separate first receive pattern;
  - receive a second transmit pattern and a separate second receive pattern;
  - configure the transmitter to transmit, over a first connection with a first access node, according to the first transmit pattern for the first connection and the receiver to receive according to the first receive pattern for the first connection;
  - configure the transmitter to transmit according to the second transmit pattern for a second connection while concurrently supporting the first connection; and wherein the processing circuit is further configured to:
provide a first coexistence indicator to the first access node, wherein the first transmit pattern and/or the first receive pattern are received in response to the first coexistence indicator, and to provide an indicator to the first access node indicating that only the transmitter is available at the UE device for connections.

\* \* \* \* \*